INVENTOR
WILLIAM L. TRACY
BY Herbert N. Thompson
his ATTORNEY

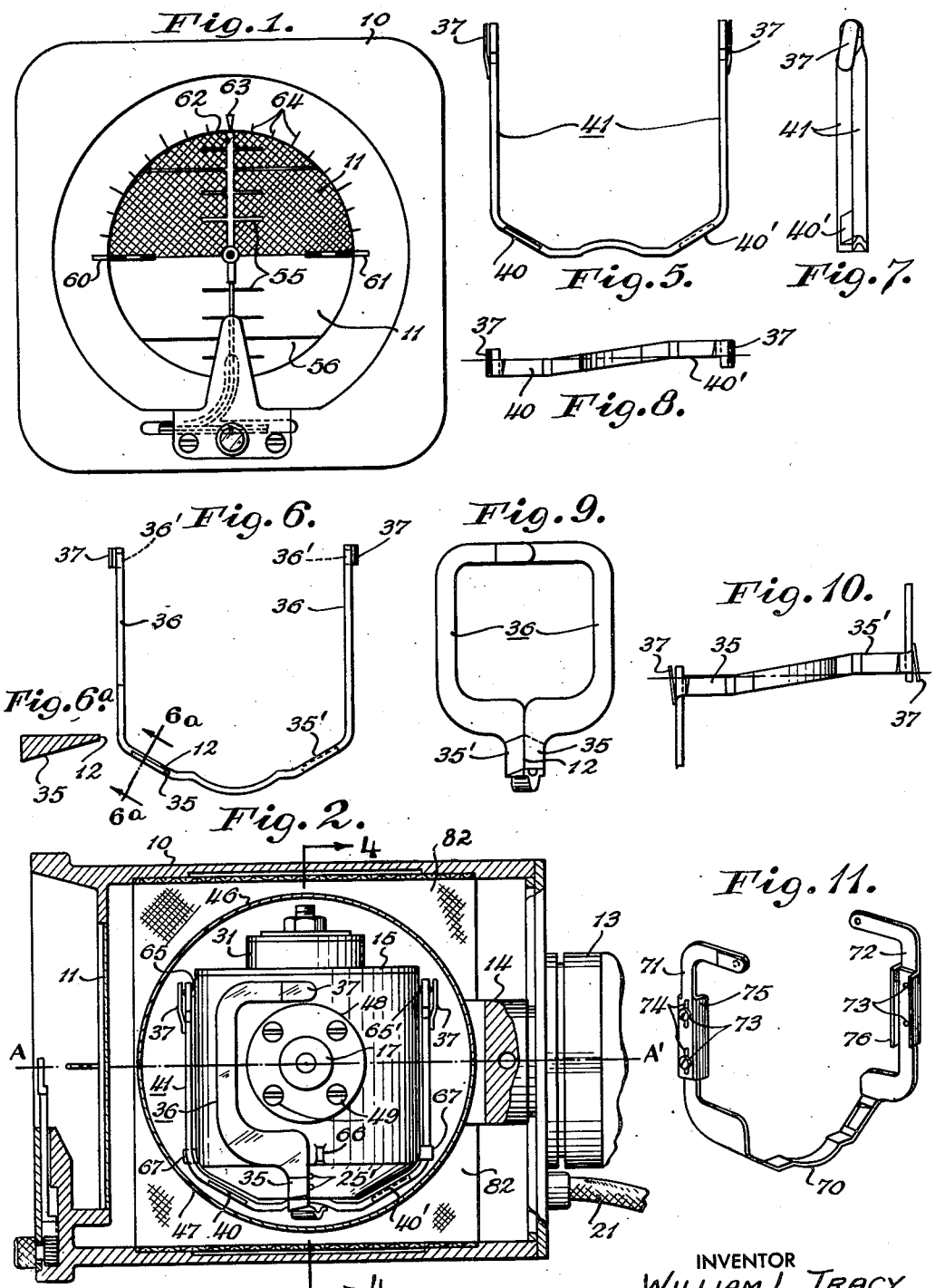

Patented July 8, 1952

2,602,334

UNITED STATES PATENT OFFICE 2,602,334

GYROSCOPIC APPARATUS

William L. Tracy, Port Washington, N. Y., assignor to The Sperry Corporation, a corporation of Delaware Application January 3, 1946, Serial No. 638,858

9 Claims. (Cl. 74—5.43)

This invention relates to gyro vertical instruments such as particularly employed in gyroscopic artificial horizons.

The invention in the present application developed from a situation demanding a small compact pneumatically driven and erected attitude gyro. Heretofore, it had been considered virtually an impossibility to construct an instrument the same size as other non-gyroscopic flight instruments without sacrificing reliability, accuracy of its readings, and the quality of other required features of a gyro vertical.

Due to the very nature of the rotor propelling force and the necessary general plan of the small gyro instrument contemplated, it was discovered that spurious air torques were imposed upon the rotor case since the erecting jets were located quite near the inside of the instrument case, as one structural cause. Even though the erection jets were placed as far away as possible from the case, a suitable subject instrument seemed to be unattainable. It was finally found that since the instrument case fitted snugly around the gyro itself, the direct blast of air from the erection jets against the case was deflected by the curvature of the case against the rotor frame and the gimbal ring.

One feature of this invention is the provision of means for overcoming the above difficulties.

Another feature of the present invention is the provision of a small instrument of this type, that is, in effect, completely maneuverable, or in other words, an instrument in which the rotor case of the gyro vertical and its gimbal are both provided with substantially 360° of freedom about the respective axes of its universal mounting.

A further feature of the invention is the provision of a gyro shell capable of preventing a phase of spurious air reaction torques.

A further feature of the invention is the provision of specially shaped pendulous shutters acting with minimum reaction with dispersion characteristics which prevent another phase of undesired air reaction in the gyro system, and which further eliminate the previous necessity of close mechanical tolerance between the deflectors or shutters and the jets or orifices of past erection devices.

A further feature of the invention is the provision of an outer casing or shell not only having the above characteristics but also being suitable for the placement thereon of craft attitude indicia.

A still further feature of the invention lies in the design of such a shell which is capable of rapid demounting when servicing of the gyrovertical is desired.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Other objects and advantages of this invention will become apparent as the description proceeds.

In the drawings,

Fig. 1 is a front elevation of an instrument constructed in accordance with the present invention;

Fig. 2 is a side elevation of the instrument shown in Fig. 1, with the case thereof in section;

Fig. 5 is a front elevation of one pair of shutters of the erection system in the subject instrument pivoted about an axis paralleling the gimbal axis;

Fig. 6 is a front elevation of a second pair of shutters of the erection system pivoted about a horizontal axis at right angles to the above first axis and in the same plane;

Fig. 6a is an enlarged cross section view on line 6a—6a of Fig. 6, showing the shutter or deflector construction;

Fig. 7 is a side elevation of the pendulous shutter structure in Fig. 5;

Fig. 8 is a plan view of the pendulous shutter structure in Fig. 5;

Fig. 9 is a side elevation of the pendulous shutter structure in Fig. 6, showing the upper portions offset to clear bearings on the gimbal arms;

Fig. 10 is a plan view of the pendulous shutter structure in Fig. 6; and

Fig. 11 is a perspective view of a three-piece stirrup-shaped frame similar to the structure of Fig. 6.

Figure 3:
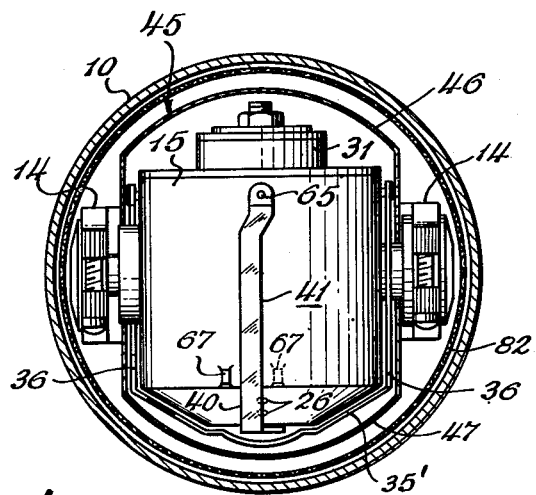
Fig. 3 is a detail front elevation of the instrument of Fig. 1, devoid of its case mounting plate, and the gyro shell being shown in section.

With particular reference to Figs. 1-4, the gyroscopic instrument constructed in accordance with the present invention is shown to include an outer case or casing 10 having a window 11 in the front wall thereof. The case 10 has a tubular extension 13 at the rear containing such items as an air filter and a long bearing of the character described in copending application Serial No. 640,665, filed January 11, 1946, by William L. Tracy, now Patent No. 2,504,166, for an improved shaft and gimbal mounting structure. The herein shown forked gimbal ring 14 is thus free to turn through 360° about the axis AA' which is parallel to the fore-and-aft axis of the craft. Within the gimbal ring 14 there is journalled the rotor case 15 by means of pivots 16, 17 supported in conventional ball bearings not shown. The rotor case 15 is free to undergo substantially a complete revolution relative to the gimbal ring 14 about the axis BB' defined by the pivots 16, 17 which is perpendicular to AA' and is normally horizontal. A complete revolution is prevented by stop pins (not shown) placed on the enlarged part of these pivots and on the inside of the instrument case 10. A rotor 18 spins in bearings 80 about a substantially vertical axis CC' in the rotor case 15.

The rotor case 15 encloses the rotor 18 and is air-tight except for a drive nozzle and a plurality of orifices or air jets 25, 25', 26, 26' of an air erection system.

Rotation of the rotor 18 is effected by exhausting air continuously from the interior of the instrument case 10 through a suction hose 21 connected to a conventional vacuum pump in a manner, generally speaking, similar to that used in the structure of the Patent No. 2,190,698 to Carter. The rotor is driven by atmospheric pressure since air impinges upon its buckets. The air reaches the buckets in the rotor by way of an exteriorly facing filter (not described) in tubular extension 13 via a conventional split gimbal bearing therein and a hollow gimbal arm leading to drive nozzle 20. After the onrushing air is spent considerably within the rotor case, it is bled away from the same through eight orifices grouped in pairs marked 25, 25' and 26, 26' found in the bottom of the special rotor case 15 now to be described. Orifices 26' are not shown in the drawings but are paired with orifices 26 in the same relationship as orifices 25, 25' and therefore are situated in the bottom rear of the rotor case, as viewed in Fig. 3. These orifices are also called jets.

In order to derive a maximum moment arm from the air reaction of these jets or orifices special consideration had to be given to the overall construction of the rotor case 15. This case 15 comprises a substantially central cylindrically-shaped body portion 30. The top of cylinder 30 is joined to a protruding body 31 formed to retain special rotor bearing parts not the subject of this invention. Since the size of the subject instrument was restricted to have dimensions, when viewed as placed in an aircraft instrument panel board, comparable with the rest of the flight instruments, it was necessary to enclose all moving parts within a compact, preferably cylindrical, instrument case 10. It is desirable to construct the rotor case and associated parts in such a way that the instrument system is mounted in neutral equilibrium or is slightly pendulous, and maximum erecting force would be created for a minimum gyro tilt of about 2°. With these points in mind, further details of the rotor case 15 are set forth. The weight of this rotor case was decreased by forming its central bottom part into a well 32 having provisions for special bearings featured in another application. The well 32 provides a chamber for receiving the air passing from the buckets of the rotor. By joining the inverted well 32 to the cylinder 30 with a sloping portion such as an inverted truncated cone 33, the limitations of pendulum action, weight and instrument case clearance discussed above is ultimately satisfied. Since effective moment arms from air reaction in the instrument system described thus far can only be attained with sufficient reliability when the air jets or orifices are oriented in a perpendicular relationship to the axis about which erection is to take place, the orifices 25, 25' and 26, 26' must be obtained by small horizontally drilled holes within the conical portion 33 of the rotor case 15. The utilization of two vertically aligned horizontal holes 25 or 25' associated with one axis as a fulcrum, promotes the condition of appreciable air velocity from the jets without sacrificing the strength of the walls in the truncated cone 33. It also makes possible rapid gyro-erecting response for reasons to be delineated hereinafter.

Returning to the erecting system, it is seen that the orifices 25, 25' are spaced at equal distances laterally from the center of the gyroscope (defined as the intersection of the axes AA', BB') and are so designed that air issuing from them when the orifices are uncovered exert equal and opposite reaction torques about the axis AA', while neither exerts any torque about the axis BB'. Similarly, the orifices or jets 26, 26' are spaced at equal distances fore and aft from the center of the gyroscope and are so designed that the air issuing from them when the orifices are uncovered exert equal and opposite reaction torques about the axis BB', while neither exerts any torque about the axis AA'. It follows that if all the jets or orifices are uncovered, the reactions they exert on the rotor case 15 are balanced, since each jet is balanced by an equal and oppositely acting stream of air.

Figure 4:
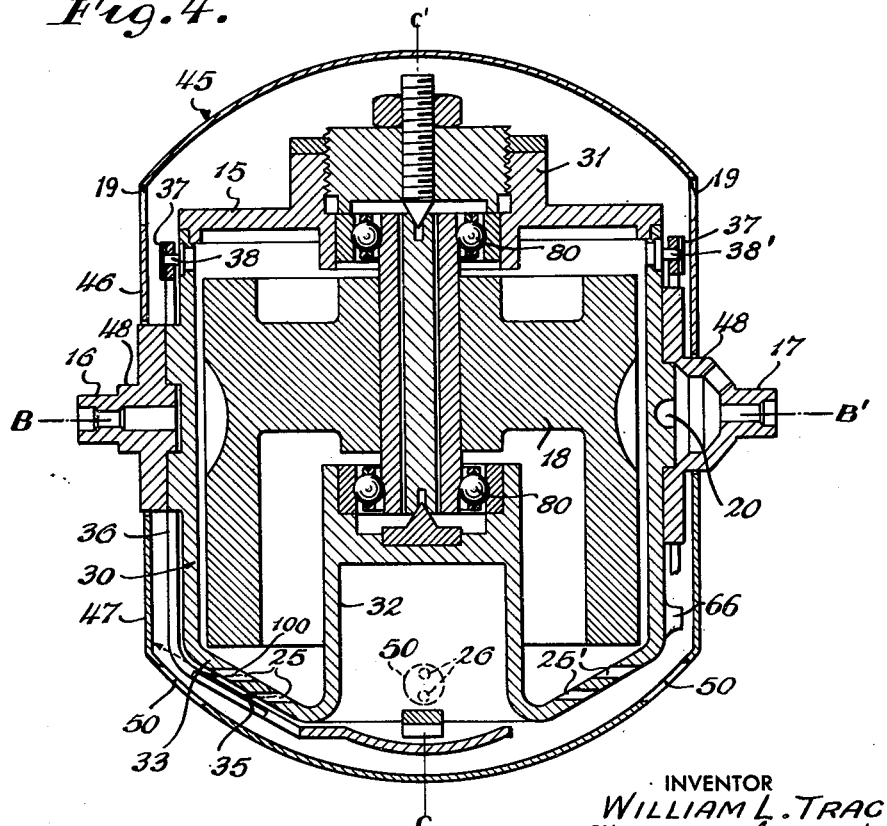
Fig. 4 is an enlarged detail front elevation of the subject instrument taken in section on the line 4—4 of Fig. 2.

The laterally spaced jets 25, 25' are variably controlled by means of shutters 35, 35', which form part of a pendulous stirrup-shaped shutter frame 36 and which variably intercept the jets 25, 25' in accordance with the tilt of rotor case 15 relative to the shutter frame 36. The frame 36 has bearing holes 36' in the upper portion of each of its arms. The rotor case has, at its upper portion, a pair of pivots 38, 38' for engaging the bearing holes 36' of the frame 36, the axis of pivots 38, 38' being parallel to the axis BB' of the rotor case. Frame 36 has a pair of exteriorly facing leaf spring members 37 anchored at one end to the frame and having its free end adjacent the bearing holes 36'. The leaf spring members 37 are for the purpose of preventing lateral movement of the frame 36 on its pivots 38, 38'. In the normal relative position of the rotor case 15 and the pendulous shutter frame 36 shown in Figs. 2, 3 and 4 which is that taken up, for example, when the axis of the rotor 18 is vertical and the shutter frame 36 is hanging freely under gravity and when no acceleration forces are effective thereon the shutters 35, 35' intercept the jets 25, 25' to equal extent, viz., they intercept substantially one-half of each jet. If this position is disturbed, e. g., by tilting of the gyroscope about the transverse axis BB' (pitch) as shown in Figs. 2 and 4, one of the jets 25, 25' is uncovered by its shutter 35 or 35' to a greater extent than normal and the other to a less extent, with the result that an unbalanced air jet reaction is applied to the rotor case. This unbalanced air jet reaction applies a torque to the rotor case about the axis AA' and thus causes the rotor case to precess about the axis BB' back towards the normal position of alignment with the shutter frame 36.

Similarly, jets 26, 26' are controlled by shutters or deflectors 40, 40' forming part of the pendulous stirrup-shaped frame 41 in accordance with the relative tilt of the rotor case 15 and stirrup frame 41. Since each pendulous shutter is pivoted from a pivot situated at an uppermost place in the central body 30 of the rotor case 15 and the associated orifices are vertically aligned with the shutter, a minimum shift of the rotor axis from a substantially vertical normal position creates a maximum erecting correction force. As a matter of fact, a 2° tilt of the gyro housing or shell unbalances the described air erecting system to such an extent that full and substantially immediate correction of same takes place.

However, the described erecting system caused errors in the reading of the instrument since not all the air bled from the rotor case 15 by the orifices described was under the influence of the proper guiding means. Some of the air became trapped above and around the gimbal arms of the gimbal ring 14 to create adverse couples within the instrument. It is not necessary to go into detail on the causes of these couples. This difficulty is partially remedied by completely enclosing the rotor case 15 with a gyro shell 45 in the form of an oblate spheroid preferably made in two sections 46, 47 which are joined on a horizontal plane. These sections are cut or tailored along the flattened portions, as shown in Fig. 4 to fit around the enlarged part 48 of the pivots 16, 17 which are fastened to the rotor case 15 by convenient means such as machine screws 49. Consequently, shell 45 is detachably fixed to the rotor case 15. Exhaust ports such as holes 50 are provided in the shell 45 in its lower section 47 opposite the paired orifices 25, 25' and 26, 26' for the purpose of bleeding air away from the space between the shell 45 and rotor case 15 including the space formed by the well 32. Additional holes 19 are provided in the top of shell 45 as indicated in Fig. 4 to prevent air pressure from building up within the shell.

Of course, now the gyro shell 45 turns with the rotor case and since it has a smooth contour it is subject much less to air turbulence than the irregular rotor case as it functions in aircraft undergoing all sorts of maneuvers. Test data on this gyroscopic instrument shows an increase of pitch erection torque of about 40 per cent and roll erection torque of about 25 per cent when the shell 45 and a screen 82 on the inside surface of the instrument case (not a part of this invention) is incorporated therein. Selected circumferential portions of the shell 45, as seen in Fig. 1, are marked with indicia such as spaced, short normally horizontal markings 55 disposed as a whole vertically when viewed in front of the instrument panel. These markings indicate the pitch attitude of the craft and since the gyro-vertical is constructed as described for ascertaining even craft attitudes in complete loops and rolls, it is desirable to paint or enamel the normally lower half portion 47 of the shell 45 in a color contrasting favorably, optically speaking, from the upper half portion 46 to give an unfailing indication to the pilot whether he is approaching an upside-down flying position. Other markings 56 similar to geographic latitude references on a globe are spaced on shell 45 which can be oriented with the fixed horizontal indicia 60, 61 on the face of the gyro-vertical seen in Fig. 1 to give a pilot his position in pitch maneuvers. Also, a meridian line 62 on the shell 45 is compared with a fixed index 63 that is a part of a bank scale 64 to provide the pilot with an indication of the attitude of the craft on which the instrument is used about its fore and aft axis.

Thus, it is seen that the two-part shell 45 is viewable from a substantially universal observation standpoint.

Another consideration in the construction of the subject gyroscopic instrument involved the problem of high and variable rotor back-pressure from the various jets due to unequal initial tolerance between the face or body of the jets and the associated deflector and that due to unequal normal wear of the bearings supporting the deflectors. Unequal back-pressure from the various orifices or jets when a normal and balanced air flow from all jets was supposed to exist caused the rotor and its case to be influenced by an initial adverse couple or erection thereby giving an incorrect instrument reading. This condition resulted in greater error as the jets involved in this action were blocked or valved by the previously designed valves in the course of erecting actions.

Hence, further study of the pendulous shutters and specifically the deflectors associated with the stirrup-shaped frames 36 and 41 appears to be necessary. First, it can be seen in Figs. 2, 4 and 9 that the upright arms of the stirrup-shaped frame 36 are curved around the bosses 48 of the pivots 16 and 17 so that the frame can swing freely through a small angle about the pivots 38, 38' without fouling the pivot bosses.

The extent of the possible angular movement of the frames 36 and 41 about the pivot axis 38, 38' and 65, 65', respectively, relative to the rotor case 15 is limited by protruding means integral with the case such as stops 66 and 67.

Now that the mounting means for the deflectors 35, 35' and 40, 40' have been thoroughly discussed, the specific features of the novel deflectors themselves can be revealed immediately by referring to Figs. 5 and 10. Complete discussion of all the deflectors is unnecessary since all deflectors are alike. They are peculiarly characterized by a knife-like appearance such as shown clearly in Fig. 6a which is a detail section of deflector 35. The fairly sharp side or knife-edge 12 normally is substantially aligned with the perpendicular center line of the two associated orifices which in this showing are orifices 25 seen in Fig. 4. Knife-edge 12 is offset from the contiguous body portions of the frame 36 in a manner shown in Figs. 9 and 10. The flat face of each deflector is held away from the face or surrounding body of each orifice by a proper separation of the upright arms in frames 36 and 41 and this separation is maintained with the aid of pivot springs 37. Also, the knife-edge which is integral with each deflector is offset from contiguous portions of the pendulum to aid in providing a substantial clearance between the knife-edge and the orifices.

These deflectors are so further formed and hung from their associated stirrup frame that they intersect the jets of air from the orifices at an oblique angle, thus the spoiled air from the orifices is directed to interior positions of the shell 45 or so as to miss the holes 50 of the same. For example, the deflector, or shutter 35 in frame 36 shown in Figs. 4 and 6, is at an angle to its upright supports and thereby it is made parallel to the surface of the truncated cone 33. The oppositely disposed knife edge portions are relatively inclined at a diverging oblique angle toward the spaced vertical shutter arms. Air indicated by the line 100, leaving the orifices 25 shown striking the exposed portion of deflector 35 having knife-edge 12, is directed for the most part upward interiorly of the hole 50.

Thus, the deflectors really act to spoil the air from the jets when they are not supposed to produce erecting torques. However, when any jet is produced as the result of exposing more than one half of the associated orifice, the spoiling effect of the deflector is non-existent for the part of the orifice which is not blocked.

It may be further desirable to provide adjustment means in the stirrup-frames 36 and 41 for changing the characteristics of its pendulum action. This is done as shown in Fig. 11 by making the paired deflectors from one cross member or element 70 and joining its upright ends to arms or uprights 71 and 72 by adjustable means such as machine screws 73 and slots 74, respectively. Arms 71 and 72 are formed in the lower portion with inwardly facing grooves or slots 75 and 76, respectively, in which the coacting ends of the cross member 70 can slide when the screws 73 are loosened in drilled and tapped holes in the cross member 70 opposite the slots 74.

The above described arrangement can also aid in compensating for bearing wear at pivots 38, 38' and 65, 65" and thus further adjust the vertical position of all the deflectors described. While the added improvement has been shown in the drawing as being directed to a specific type of stirrup-shaped frame, it is to be understood that it can be used with a variety of frames or pendulous shutters.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyro-vertical comprising a gyro rotor, a rotor bearing case having an inwardly sloping bottom portion, a gyro shell, means for supporting all of the same for oscillation about horizontal axes in substantially neutral equilibrium and with the rotor having a normally vertical spin axis; gravitationally responsive means for maintaining said spin axis erect including a plurality of pairs of opposed orifices normally horizontally positioned at said bottom portion emitting jets of air and adapted thereby to exert erecting torques on said rotor case about either of said horizontal axes, and a plurality of pairs of pendulous shutters pivotally suspended from the upper part of the case, each pair of said shutters forming part of a stirrup-shaped frame extending around the lower part of said case, a lower side of each one of said pendulous shutters having a knife-formed portion adjacent to said sloping bottom portion and being displaced outwardly initially from each of said orifices to spoil the jets issuing from said orifices and to ultimately create an air deflection action for altering the relative strength of said torques about either one of said axes upon relative inclination of said means and said case about the other of said axes, said gyro shell being an oblate spheroid formed from two parts joined at a horizontal plane and having openings opposite said jets, said shutters intersecting each of said jets at an oblique angle whereby the spoiled air is substantially directed to portions surrounding said shell openings interiorly of the same and whereby erecting action can take place only when the shutters are in a position to permit above normal air flow out of the openings in the gyro shell.

2. The combination in an air erected gyro vertical of, a universally mounted rotor-bearing case with an exterior portion in the form of a generally spherical shell having pitch and roll indicia thereon and with an interior portion having a lower part exteriorly shaped in the form of an inverted truncated cone, a pair of oppositely disposed horizontal ports in the lower part of said interior portion of the case and a pair of adjacent ports in said shell from which jets of air normally issue to exert equal and opposite torques about one of the axes of universal mounting of the case, and a pendulous shutter for differentially intercepting the jets of air pivotally mounted on said case to depend below the lower part of the interior portion thereof, said shutter including knife blades situated between the ports in the exterior and interior portions of said case and arranged in spaced parallel relation to the inverted cone-shaped part of said case.

3. A gyro vertical as claimed in claim 2, in which said shell includes ports in its upper portion.

4. The combination in an air erected gyro vertical of, a universally mounted rotor-bearing case having a closed lower part exteriorly shaped in the form of an inverted truncated cone, a pair of oppositely disposed horizontal ports in said lower part from which jets of air normally issue to exert equal and opposite torques about one of the axes of universal mounting of the case, and a pendulous shutter for differentially intercepting the jets of air pivotally mounted on said case, said shutter depending below the case and including knife blades adjacent the respective ports arranged in spaced parallel relation to the inverted truncated cone shaped part of said case.

5. In an air erected gyro vertical, a rotor case having two pairs of oppositely disposed ports at right angles to one another from which erecting jets of air issue, a first pendulum depending from the exterior of said case having knife edges respectively situated in the plane of and at an oblique angle to the air jets from one of the pairs of ports, and a second pendulum depending from the exterior of said case at right angles to said first pendulum having knife edges respectively situated in the plane of and at an oblique angle to the air jets from the other of the pairs of ports.

6. In an air erected gyro vertical, a rotor-bearing case having an attitude indicating shell of generally spherical shape, said shell having four openings in the bottom thereof and two openings in the top thereof.

7. In an air erected gyro vertical, a rotor-bearing case having a bottom exterior portion formed in the shape of an inverted truncated cone, said portion having two mutually perpendicular pairs of horizontal openings in the conical surface thereof.

8. In an air erected gyro vertical, a pendulous shutter having two spaced vertical arms and a bottom part connecting said arms having two straight, oppositely disposed, knife edge portions inclined at a diverging, oblique angle toward said vertical arms.

9. In an air erected gyro vertical, a rotor case having oppositely disposed ports therein from which jets of air issue, and a pendulous shutter pivotally mounted on the exterior of said case having two spaced vertical arms and a bottom part connecting the arms having two straight, oppositely disposed, knife edge portions inclined at a diverging oblique angle toward the vertical arms, said shutter being so constructed and mounted that the knife edge portions thereof differentially intercept the air jets upon relative tilt between the shutter and case.

WILLIAM L. TRACY.

REFERENCES CITED

The following references are of record in the file of this patent:

UNITED STATES PATENTS

| Number | Name | Date |
|---|---|---|
| 1,324,482 | Titterington | Dec. 9, 1919 |
| 1,518,892 | Bates | Dec. 9, 1924 |
| 1,726,643 | Borresen | Sept. 3, 1929 |
| 1,939,825 | Narvesen et al. | Dec. 19, 1933 |
| 2,183,939 | Moss | Dec. 19, 1939 |
| 2,249,744 | Carter | July 22, 1941 |
| 2,278,913 | Carter | Apr. 7, 1942 |
| 2,344,126 | Carlson | Mar. 14, 1944 |
| 2,365,439 | Schulze | Dec. 19, 1944 |
| 2,366,543 | Meredith | Jan. 2, 1945 |
| 2,368,058 | Whatley | Jan. 23, 1945 |
| 2,373,120 | Kenyon | Apr. 10, 1945 |
| 2,390,532 | Haskins, Jr., et al. | Dec. 11, 1945 |
| 2,395,251 | Carlson | Feb. 19, 1946 |
| 2,420,674 | Moore et al. | May 20, 1947 |